(12) United States Patent
Weydmann

(10) Patent No.: US 6,390,265 B1
(45) Date of Patent: May 21, 2002

(54) CLUTCH ASSEMBLY

(75) Inventor: Patrick Weydmann, Bühl (DE)

(73) Assignee: Luk Lamellen und Kupplungsbau GmbH, Buhl/Baden (DE)

( * ) Notice: Subject to any disclaimer, the term of this patent is extended or adjusted under 35 U.S.C. 154(b) by 0 days.

(21) Appl. No.: 09/524,430

(22) Filed: Mar. 13, 2000

(30) Foreign Application Priority Data

| Mar. 12, 1999 | (DE) | ........................................ 199 11 080 |
| May 5, 1999 | (DE) | ........................................ 199 20 549 |

(51) Int. Cl.⁷ ........................... F16D 21/02; F16D 13/75
(52) U.S. Cl. ................... 192/48.8; 192/70.25
(58) Field of Search ................. 192/70.25, 111 A, 192/70.29, 48.7, 48.8, 48.9, 48.91

(56) References Cited

U.S. PATENT DOCUMENTS

| 3,749,213 | A | * | 7/1973 | Maucher | .................... 192/48.8 |
| 3,779,353 | A | * | 12/1973 | Maucher | .............. 192/70.29 X |
| 4,026,400 | A | * | 5/1977 | Rawlings | .............. 192/70.29 X |
| 4,099,604 | A | * | 7/1978 | Higgerson | .............. 192/111 A |
| 4,116,322 | A | * | 9/1978 | Ashfield | ..................... 192/48.8 |
| 4,429,776 | A | * | 2/1984 | Maucher et al. | ........ 192/48.8 X |
| 4,715,484 | A | * | 12/1987 | Flotow | ..................... 192/70.25 |
| 5,337,874 | A | * | 8/1994 | Oltean et al. | ............ 192/111 A |
| 5,678,669 | A | * | 10/1997 | Rainer | ........................ 192/48.8 |
| 6,024,199 | A | * | 2/2000 | Uenohara et al. | ........ 192/70.25 |
| 6,050,381 | A | * | 4/2000 | Uehara et al. | ............ 192/70.25 |

FOREIGN PATENT DOCUMENTS

GB    2 212 229    *    7/1989

* cited by examiner

Primary Examiner—Rodney H. Bonck

(57) ABSTRACT

The invention relates to a clutch assembly which is designed to be self-adjusting. The invention relates to a multi-plate clutch assembly as well as to a method for operating a multi-plate clutch which can be produced cost-effectively in a structurally simple manner and which has an improved release characteristic. In particular the clutch has a more constant release characteristic with a high operating accuracy over the entire service life.

64 Claims, 9 Drawing Sheets

CLUTCH ASSEMBLY

BACKGROUND OF THE INVENTION

1. Field of the Invention

The invention relates to a self-adjusting clutch assembly, in particular for commercial vehicles or tractors, as well as to a method for operating a clutch assembly.

2. Description of Related Art

Clutch assemblies having a multi-plate clutch are already known.

These known clutch assemblies which are used in the case of commercial vehicles or tractors, have a driving clutch as well as a clutch for additional implements. These clutches are operable separately through a clutch pedal or through a hand lever.

These known clutch assemblies are suitable for use in vehicles where a separate clutch is to be provided for driving and a separate clutch is to be provided for the implements.

These known clutches all have the drawback that when the clutch discs wear out the operating point of the clutch is shifted so that the release force required to operate the clutches varies accordingly.

SUMMARY OF THE INVENTION

The object of the invention is therefore to provide a clutch assembly for a multi-plate clutch as well as a method for operating a multi-plate clutch which can be produced cost-effectively in a structurally simple manner and which has an improved release characteristic, more particularly a more constant release characteristic with a high operating accuracy over the entire service life.

Thus according to the invention it is proposed to design a clutch assembly, more particularly a clutch assembly for a motor vehicle, such as a commercial vehicle or a tractor, with at least a self-adjusting clutch device with at least one clutch disc and at least two contact pressure plates.

The clutch assembly preferably has a clutch disc which can be coupled, more particularly with keyed engagement, to two contact pressure plates.

It is also preferable if the clutch assembly has a number of clutch discs, such as for example two clutch discs which can each be coupled, more particularly with keyed engagement, to one or more contact pressure plates.

The invention is particularly advantageous because the operating force of the clutch assembly can be kept within a predetermined tolerance band as a result of the self-adjusting device of the clutch assembly or of the clutches. The width of this tolerance band is preferably aimed at zero.

According to a particularly preferred embodiment of the invention a device is provided which keeps the installation position of a plate spring substantially unchanged throughout the entire wear on the lining and thus keeps the release force of the clutches, more particularly of two clutches, unchanged and guaranteed throughout the service life. The plate spring thereby preferably loads pressure plates which act on the linings or the discs.

This device which keeps the installation position of the plate springs substantially constant preferably has at least one cast ring and at least two sheet metal tapered rings wherein one of these sheet metal tapered rings is connected rotationally secured to a pressure plate, more particularly to the pressure plate on the transmission side. This device also preferably has two circumferentially mounted compression springs which in the event of wear at least partially or under predetermined conditions turns one of the tapered rings relative to the other tapered ring until the wear in the axial direction is compensated. This device is preferably coupled to a driving clutch or to a clutch on the transmission side.

In a particularly preferred embodiment during activation of the clutch through an operating mechanism, for example through a lever, the cast ring is displaced in the axial direction, with a stepped bolt or friction device causing a pressure plate to lift off from the friction lining or disc. More particularly the friction force applied to the stepped bolt is greater than the operating axial compression spring force—according to the geometry of the taper.

It is preferable if, in the event of wear on the clutch disc on the engine side or on the transmission side, as a result of force applied by a plate spring a contact pressure plate, more particularly a pressure plate on the engine side, draws the stepped bolt through the bolt head of this stepped bolt out from the friction device and thus release a gap at a shoulder or ledge of the stepped bolt.

Then preferably when operating a clutch, more particularly a clutch on the transmission side, through a lever the cast ring is moved up to the shoulder or to the ledge of the stepped bolt so that the tapered rings can be turned relative to each other under the action of a compression spring force acting on at least one of these tapered rings, preferably on both tapered rings, so that the wear in the axial direction is compensated and the plate spring swings back again in its original installation position. The level of the release force of the clutch device thus corresponds again to the level in the new state or in the substantially unworn state.

Thus according to the invention an assembly of several clutches is provided wherein the release characteristic of at least two of these clutches is constant or unchanged over the entire service life of the clutches or at least an element of these clutches. An element of this kind over the service life of which the release characteristic of the clutch or the release characteristics of the clutches is constant is in particular at least a disc or at least a clutch lining of the clutch assembly.

The element over the service life of which the release characteristic of the clutch or clutches is constant is preferably an element which has the fundamental property of influencing the release characteristic of the clutch assembly.

It is proposed for example that an element, such as for example a friction lining or a disc is provided which when changed or shifted in position would or does basically influence the release characteristic of the clutch or one of the clutches. Despite the presence of such an element the release characteristic is preferably kept substantially constant. This is achieved for example in that the influence which the thickness of the friction lining or the thickness of the discs has on the release characteristic is substantially compensated by a self-adjusting device.

According to the invention it is thus proposed that a clutch assembly having at least one clutch disc and at least two contact pressure plates is provided with an adjustment device for compensating at least in part changing or changed operating conditions of the clutch device.

By operating conditions of the clutch assembly are meant here in particular the characteristic values of the clutch assembly or characteristic values which characterise the operating process of the clutch assembly. By way of example the operating time for releasing the clutch or the operating force or the time path of the operating force or the like can be considered as an operating condition.

It is also preferable if predetermined operating conditions or predetermined operating characteristic values are set whereby when these are changed or at the start of a change the adjustment device triggers, more particularly independently or automatically, measures for compensating this change. According to the invention it is preferable if the adjustment device controls or regulates predetermined positions or relative positions of structural elements.

This problem is further solved by a clutch assembly having at least one clutch disc and at least two pressure plates.

Thus according to the invention it is proposed to provide a clutch assembly with at least one spring device, more particularly a plate spring device, wherein the position of the plate spring device can be controlled or regulated by a control or regulating device. The plate spring device thereby preferably acts on the contact pressure plate. The plate spring device thereby preferably acts on the contact pressure plates so that the pressure plates when the operating device for operating the clutch is not activated are pressed against the friction linings or the discs of the clutch assembly so that the clutches are substantially in a closed state.

It is however also preferred if when the operating device of the clutch assembly is not activated the spring device or the plate spring device holds one or more of the pressure plates in an opened state so that the relevant clutch is substantially opened.

Two contact pressure plates are thereby preferably provided to form when the clutch is closed a positive, more particularly a keyed, connection with the clutch discs or friction linings. The plate spring device thereby preferably tensions the contact pressure plates between the clutch discs.

It is thereby preferred if a predetermined operating characteristic is maintained within a predetermined interval with a predetermined interval length by the regulating device or control device. More particularly it is preferred if the operating characteristic is maintained within an interval so that a maximum permissible upper deviation and a maximum permissible lower deviation is defined for each operating point. It is also preferable if the maximum upper deviation and the maximum lower deviation agree with each other and is substantially the same for all operating points of the operating characteristic.

It is preferred if the interval length of the interval aims at being zero so that the operating characteristic is actually maintained substantially constant.

According to a particularly preferred further development of the invention the clutch assembly is provided with at least one adjustment device by which at least one clutch characteristic value can be regulated in dependence on the wear on the clutch, more particularly the wear on the clutch discs or linings.

An adjustment device is preferably provided by which in dependence on at least one operating characteristic value, such as for example the spring force existing in a predetermined state of the plate spring device, at least a further characteristic value of the plate spring device can be adjusted so that the spring force of the plate spring device is regulated substantially to a predetermined value under predetermined conditions.

Thus according to the invention it is proposed for example that the position of the plate spring device under predetermined conditions is displaced in dependence on the spring force of the plate spring device so that the spring force of the plate spring device again assumes its original value. It should be noted that predetermined conditions hereby preferably exist. By way of example a predetermined position is set of the pressure plates (e.g. extreme position) or a predetermined position of the operating lever of the operating device of the clutches (e.g. extreme position).

According to a particularly preferred embodiment of the invention the adjusting device or the self-adjusting device for adjusting the clutch device or the clutches is designed to be path-controlled.

According to a particularly preferred embodiment of the invention the clutch device has at least one operating device, such as for example an operating lever, for operating the clutch. It is preferable if separate operating devices are provided for the different clutches, i.e. more particularly for different spots at which the force flow can be selectively interrupted or closed. It is also preferable if a single operating device, such as for example a single operating lever or the like is provided for operating several clutches.

According to a particularly preferred embodiment of the invention during the course of the self-adjusting process of the clutch assembly, or clutch devices, a force equilibrium is set, more particularly increasing. It is also preferred if with a path-controlled adjustment device during the self-adjusting process a force equilibrium is increasingly set. By way of example the position of a plate spring device is hereby regulated or controlled whereby the force applied by the plate spring device interacts with other forces so that a force equilibrium is set.

A particularly preferred clutch assembly according to the invention has n clutch discs and/or m clutches and/or p pressure plates wherein n, m$\in$N and p$\in$N$\geq$2.

A clutch assembly according to the invention preferably has two clutches which in a particularly preferred embodiment are both self-adjustable.

It is particularly preferred if the clutches, more particularly the two clutches, are self-adjusting by an identical adjustment device. It is thereby particularly preferred if the self-adjusting process is substantially in part identical substantially independently of the identity of the worn clutch discs.

By way of example in the event of wear on any one clutch disc or any one friction lining a plate spring device adopts a position which it would likewise adopt if wear of a similar amount were to appear on any other clutch disc or any other friction lining or if the sum of the wear on several clutch devices would correspond to this wear. In the adjusting process the original position or installation position of this plate spring device for example is produced again so that independently of where the wear has occurred, during the adjustment process a substantially identical first position of the plate spring device is changed each time into a likewise substantially identical second position of the plate spring device.

According to a particularly preferred embodiment of the invention the clutch assembly or the clutches has/have n clutch discs and p pressure plates wherein an adjustment device is related to the p pressure plates. By this is meant that the adjustment device takes into account the potential wear occurring on each friction face of a clutch disc which forms a friction-locking connection at least at times with one of the p pressure plates so that the relevant clutch is closed.

According to a particularly preferred embodiment of the invention the adjustment or self-adjustment of the clutch assembly is carried out under predetermined conditions. By way of example the adjustment or self-adjustment is always carried out when the clutch is released.

It is also preferred if the self-adjustment is undertaken during engagement of the clutch.

According to a particularly preferred embodiment of the invention a device is provided for preventing uncontrolled adjustment of the adjustment device. A device of this kind has for example a pin, such as a bolt or a stepped bolt. A device of this kind for preventing an uncontrolled adjustment of the adjustment device is preferably designed as a friction device and/or as a clamping device. It is thereby ensured by a friction and/or clamping device of this kind that an adjustment is only possible under predetermined conditions, such as for example in the presence of predetermined force conditions.

These predetermined forces can be determined for example by geometric conditions, such as in particular the geometric conditions of the clutch discs, thus e.g. the question of the presence or absence of wear.

According to a particularly preferred embodiment of the invention adjustment is carried out (automatically) so that with the clutch closed the pressure plates apply each time substantially a constant force on the clutch discs throughout the service life.

A motor vehicle with clutches according to the invention preferably has at least one driving clutch and/or at least one clutch for assemblies.

According to a particularly preferred embodiment of the invention the adjustment device has at least a first and a second device wherein the first device releases an area in the event of wear on at least one of the clutch discs. By way of example a lash or play is produced in the event of wear. This area or this play is eliminated or compensated again by the second device for removing the wear-conditioned influence on predetermined operating characteristic values of the clutch or clutch adjustment process under predetermined conditions, thus in particular at predetermined time points or under predetermined conditions. By way of example an element, such as a stepped bolt, is mounted with friction engagement in a contact pressure plate. The friction engagement existing between this bolt or this element and the pressure plate can thereby be overcome under predetermined conditions whereby a relative displacement of the element opposite the pressure plate is produced in particular by a first (part) device. This relative displacement preferably corresponds to the wear which has appeared on at least one of the clutch discs.

As a result of this relative displacement of the bolt opposite the pressure plate the bolt also changes its position relative to a further element, such as for example a further plate aligned parallel with the pressure plate.

In order to compensate the wear-conditioned influences on the clutch process the relative displacement which the bolt has undergone relative to the additional plate, such as intermediate plate, is then compensated under predetermined conditions by a second device. The relative position of the further plate (intermediate plate) opposite the aforementioned pressure plate is hereby preferably changed.

The relative displacement between the further plate (intermediate plate) and the pressure plate thus preferably also corresponds to the wear which has appeared.

If now for example the distance has changed between at least one of two friction linings and at least one of two clutch discs, since at least one of these clutch discs has worn, then for example the path change between these clutch discs is compensated through a change in the spacing between an intermediate disc and a pressure plate whereby the interspace between the friction linings is filled out more particularly by a series connection of the pressure plate, the intermediate plate and a spring device, such as plate spring device, and where applicable further substantially rigid elements.

According to a particularly preferred embodiment of the invention the clutch assembly according to the invention has at least one sensor device for detecting a relative movement between different pressure plates. This sensor device detects more particularly a changed relative position of the pressure plate under predetermined conditions, By way of example this sensor device detects a changed maximum spacing between the pressure plates. This maximum spacing is for example determined by the spacing of two friction linings or discs. The spacing changes as a result of the wear on these friction linings.

According to a preferred embodiment of the invention this sensor device has at least one bolt. It is also preferred if the sensor device or adjustment device is coupled to at least one operating element for operating at least one of the clutches so that the adjustment or detection of a relative movement is automatically undertaken during operation of this operating element.

According to a particularly preferred embodiment of the invention the sensor device is coupled to at least one component part which is moved during an operating process of one of the clutches in dependence on the operating movement.

A component part of this kind is for example an intermediate lever.

According to a particularly preferred embodiment of the invention the adjustment device and/or the sensor device has at least one clamping or friction device. A clamping or friction force is preferably applied by a friction or clamping device of this kind. This clamping or friction action is provided in particular to connect elements which are or are to be coupled together under first conditions and which are to be mounted movable relative to each other under second predetermined conditions.

By way of example a clamping or friction connection of this kind is provided between a bolt, more particularly a stepped bolt, and one of the pressure plates.

It is preferable if a predetermined clamping or friction force can be applied by the friction or clamping device and which is produced for example by a fitting with oversize, such as a close tolerance or transition fit, or by means of a spring device or the like.

By way of example the friction or clamping device has a clamping screw which, screwed in axially or circumferentially, applies in the radial direction a clamping force on a bolt device. A screw of this kind is screwed into the pressure plate for example and contains in its inner space a bolt device or stepped bolt device. It is also preferred if a clamping screw of this kind is formed as a type of clamping sleeve.

It is preferred if a substantially adjustable clamping force or friction force can be applied by the clamping screw or sleeve or friction or clamping device.

By way of example a substantially constant clamping force can be applied throughout the service life by the clamping or friction device or the clamping screw or sleeve whereby this clamping force is exerted preferably on a bolt device, such as a stepped bolt device and thus holds this stepped bolt device always fixed opposite the pressure plate when the relative force between the pressure plate and stepped bolt is less than a relative force, which is predetermined in terms of direction and size, between the stepped bolt and this pressure plate.

According to a particularly preferred embodiment of the invention the clamping screw and/or the clamping sleeve is a component part which is slit substantially lengthwise at least in part or is slit with a longitudinal component. This component part is slit in screw fashion for example. A slit of this kind makes it possible for example for the walls of the clamping screw or clamping sleeve to move radially inwards when biased by radial force and thus to apply a clamping force.

It is preferable if the clamping force is overcome under predetermined conditions when wear appears on at least one of the clutch devices. By way of example the clamping force is overcome immediately if wear has occurred, so that a relative displacement takes place between the bolt and pressure plate. It is also preferred if the bolt device slides relative to the pressure plate at another point in time.

According to a particularly preferred embodiment of the invention the bolt embraced by the friction or clamping device is a stepped bolt which has different diameter ranges so that an axial stop is formed.

According to a preferred embodiment of the invention a second stop can be additionally provided to restrict movement in a second axial direction, and is mounted more particularly on the stepped bolt, for example in the form of a bolt head.

According to a particularly preferred embodiment of the invention the bolt device which is embraced by the friction or clamping device is arranged so that it runs substantially axially movable through a first pressure plate and an intermediate plate which is mounted between a first and second pressure plate.

It is preferable if the aforementioned stops or ledges serve as a stop for this first pressure plate and this intermediate plate.

According to a particularly preferred embodiment of the invention the bolt device is secured against slipping out. More particularly the bolt device is secured against slipping out from the contact pressure plates or the intermediate plate.

According to a particularly preferred embodiment of the invention an intermediate device, such as for example an intermediate plate, is mounted spatially between the first and second pressure plate, with the intermediate plate being held through a friction device at a certain distance from the second pressure plate, and this distance being variable in the event of wear. A plate spring device ensures for example force is applied on the pressure plates in the direction of the relevant clutch disc or friction lining, whereby the plate spring device is mounted between the first pressure plate and the intermediate plate.

According to a particularly preferred embodiment of the invention the intermediate plate, as also preferably the pressure plate, is mounted axially movable wherein it is particularly preferred if under predetermined conditions the movement of the intermediate plate is blocked or prevented in at least one orientation.

By way of example the movement is blocked in a first orientation if the second pressure plate adjoins the one disc or a friction lining.

According to a particularly preferred embodiment of the invention the adjustment device has an overrunning type device or an overrun which adjusts the clutch assembly under predetermined conditions,. More particularly this adjustment takes place for example at least at times in the event of wear on the friction linings. The overrunning device is mounted for example between the intermediate plate and the second pressure plate. It is preferable if this overrunning-type arrangement in the event of movement in a first direction increases the distance between the intermediate plate and the second pressure plate, whilst the movement is blocked in the counter direction.

Under predetermined conditions, more particularly at least at times, the overrun can be moved in its overrunning direction so that the distance between the intermediate plate and the second pressure plate increases.

In a corresponding way an adjustment device can also be mounted for example between the plate spring device and one of the pressure plates or between the pressure plates.

A corresponding device which is likewise designed for example as a type of overrun, for increasing the distance, which is arranged between the force introduction points of the spring device or plate spring device, is also preferred.

According to a particularly preferred embodiment of the invention the adjustment device has at least two elements which contact one another and which in the event of a predetermined movement or with a predetermined introduction of force or force direction execute a movement relative to each other which leads to a change in the spacing, more particularly to an increase in the spacing in a predetermined direction.

According to a particularly preferred embodiment of the invention one of these two elements is biased by an energy accumulator device, such as a spring. This spring force is counteracted under first predetermined conditions or circumstances by a counter force so that a relative displacement of the two elements of the adjustment device is substantially avoided. Under second predetermined conditions or circumstances, the counter force decreases at least so that the two elements of the adjustment device move relative to each other under the action of the spring force or a part of the spring force.

The two aforementioned elements of the adjustment device are for example the already mentioned tapered rings. By way of example these tapered rings change their axial spacing as a result of their facing inclines during rotation. It is preferable if detents are provided on the slopes of these tapered rings to engage in each other so that a reduction in the spacing of the rings is substantially prevented by the detent formation.

It should be noted that other spacers or fixing devices can also be provided in place of or as an addition to the detents.

The surface contour, particularly on the slope side, of the tapered rings is preferably formed with a linear rise. It is also preferred if this surface contour is curved or follows an exponential function. Other functional or non-functional surface contours are also preferred.

According to a particularly preferred embodiment of the invention the change in the axial spacing of the tapered rings in the event of their rotation corresponds to the play which is to be compensated. More particularly it is preferred if the tapered rings have a linear surface rise wherein a is the pitch angle of this linear rise and tan a corresponds to the play which is to be compensated.

It is also preferable if the surface contour on the slope side of the tapered rings which preferably rotate relative to each other is different and follows for example different functions.

According to the invention it is preferred if each of the pressure plates when the clutch is closed contacts precisely a clutch disc or precisely a friction lining. It is also preferred if a pressure plate contacts different friction linings when the clutch is closed. By way of example when the clutch is closed a pressure plate contacts two different friction linings simultaneously. It is also preferable if a pressure plate for closing a first clutch contacts a first pressure plate and for closing a second clutch contacts a second pressure plate. It is further preferred if the pressure plate or pressure plates is or are formed with variable thickness.

BRIEF DESCRIPTION OF THE DRAWINGS

The invention will now be explained in further detail with reference to the non-restricting embodiments illustrated by way of example in the drawings in which.

DETAILED DESCRIPTION OF PREFERRED EMBODIMENTS

Figure 1:
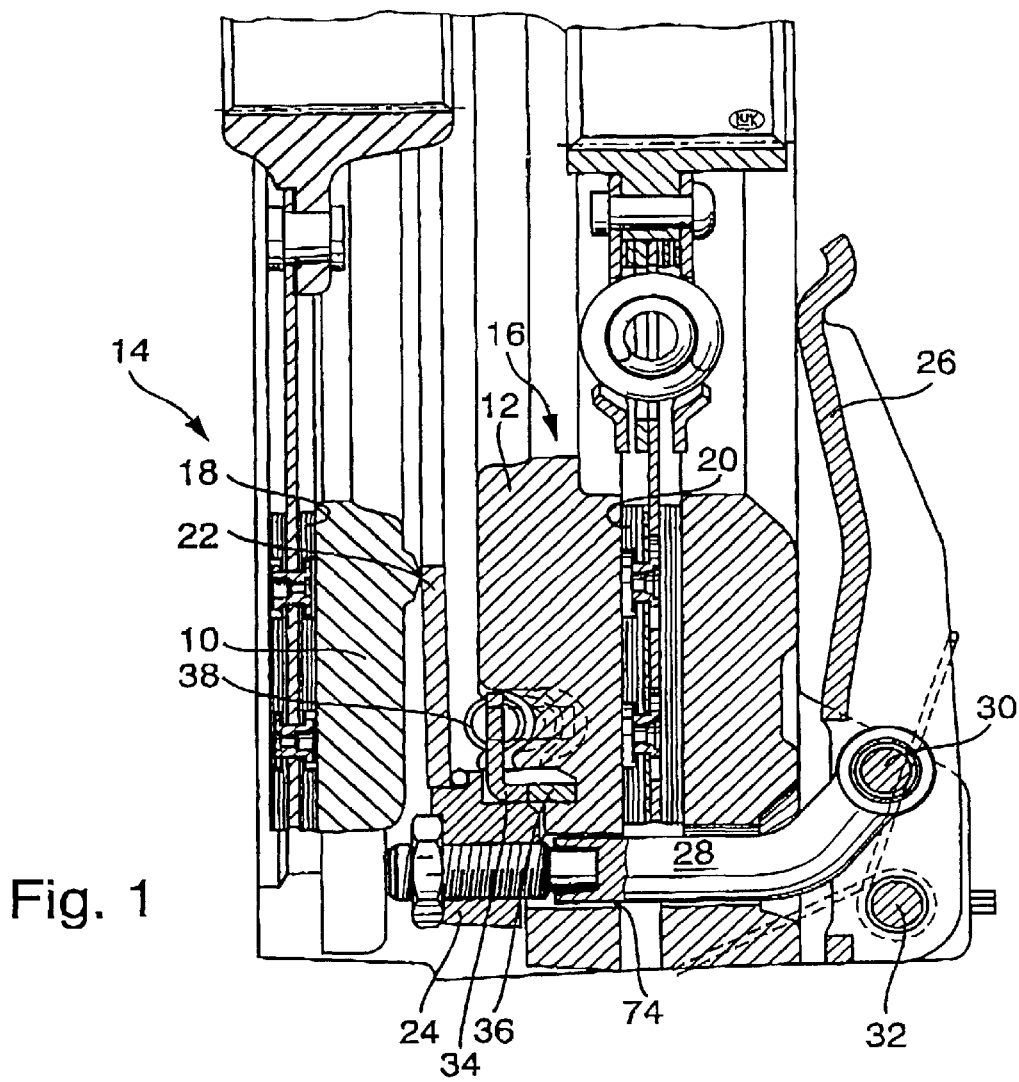
FIG. 1 shows an example of an embodiment of the invention in a partial sectional view taken along a first section plane in which the clutch is in a first shift position and the clutch discs are in a first state.

FIG. 1 shows an example of an embodiment according to the invention in a diagrammatic partially sectional view wherein the clutch discs are located in a first, more particularly unworn, state. The clutch is thereby shifted in a first clutch position.

The figure shows two pressure plates 10, 12 which with the clutch 14, 16 closed adjoin the relevant linings 18 and 20 with friction engagement. The clutch devices 14, 16 are each held in a substantially closed clutch position—more particularly by the plate spring device 22.

The contact pressure plates 10, 12 are thereby substantially tensioned between the linings 18, 20 through the action of the plate spring device 22. Thus the two clutch devices 14, 16 are basically held in a closed position more particularly by a single plate spring device 22.

In the embodiment according to FIG. 1 the plate spring device 22 is supported with one side on the contact pressure plate 10 on the engine side, and with the other side on an intermediate device or intermediate plate 24. This intermediate plate 24 is substantially in fixed connection with the operating lever 26. This connection is produced in the example according to FIG. 1 by screwing the intermediate plate 24 onto an intermediate lever 28 which in turn is connected by the articulated joint 30 to the operating lever 26.

The operating lever 26 is in the illustration shown in FIG. 1 a lever through which the clutch device 16 can be opened.

By way of example in order to open this clutch device 16 several operating levers 26 are provided, e.g. arranged star-shaped relative to each other. By way of example three operating levers 26 are arranged star-fashion to control the clutch device 16.

Preferably, but not shown in FIG. 1, at least one operating lever is likewise provided for releasing the clutch device 14 on the engine side. By way of example three operating levers are likewise provided for controlling or releasing the clutch device 14. These operating levers for operating the clutch device 14 are likewise arranged star-fashion relative to each other for example. It is preferable if one operating lever for controlling the clutch device 14 is arranged each time between two operating levers 26 for controlling the clutch device 16.

The operating lever 26 which is attached to the intermediate lever 28 by the articulated joint 30 is attached to the housing at a second articulated point 32.

The intermediate plate 24 is pressed against the pressure plate 12 substantially under the action of the plate spring device 22 so that the pressure plates 10, 12 are tensioned against each other.

The intermediate plate 24 thereby preferably lies not directly against the pressure plate 12 but against the first tapered ring 34. This first tapered ring 34 thereby adjoins in the direction of the pressure plate 12 a second tapered ring 36 which in turn is supported against the pressure plate 12.

The first tapered ring 34 and the second tapered ring 36 are biased by the spring device 38. The spring device 38 which is formed for example as a compression spring or traction spring or as a rotary spring device, biases the first tapered ring 34 so that when there is no or no sufficient counter force the tapered rings 34, 36 are moved or turned relative to each other so that the distance between the end of the tapered ring 34 facing the intermediate plate 24 and the end of the second tapered ring 36 facing the pressure plate 12 is increased. Consequently when there is no or no sufficient counter force to the pretensioning force of the spring device 38 the distance between the intermediate plate 24 and pressure plate 12 would increase. This change in the spacing or change in the length is preferably controlled so that it always adapts to the sum of the wear-conditioned erosions on the linings 18, 20.

It is hereby possible by way of example according to the invention to keep the plate spring device 22 substantially in a position which is independent of the wear. This in turn means that the spring or pretensioning force of the plate spring device 22 is substantially independent of the wear-conditioned erosion on the linings 18, 20.

This in turn makes it possible for the operating force which is to be applied to the operating lever or the operating torque which is to be applied to the operating lever, to be substantially independent of the wear on the linings 18, 20.

Figure 2:
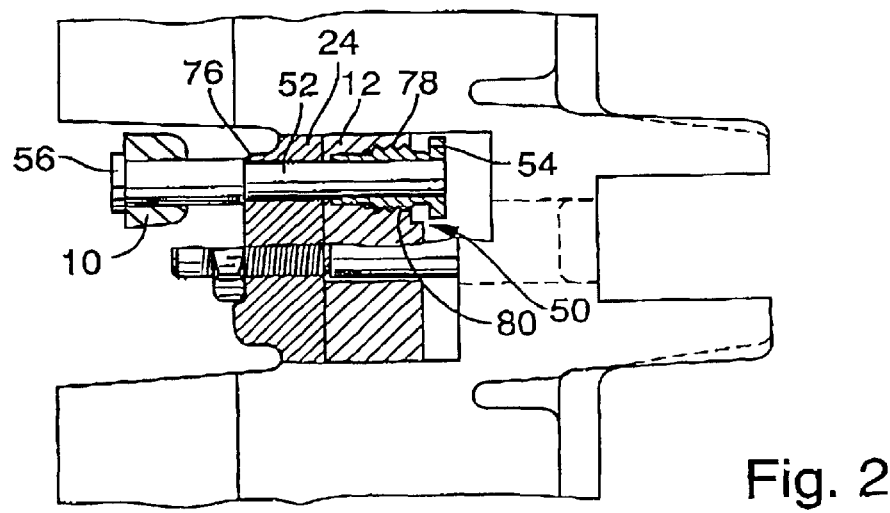
FIG. 2 shows the example of an embodiment according to FIG. 1 in a second sectional plane.

FIG. 2 shows the embodiment according to the invention of FIG. 1 in a diagrammatic partially sectional view in a second sectional plane.

This view likewise shows the first pressure plate 10, the second pressure 12 and the intermediate plate 24.

FIG. 2 further shows a holding/release device or a friction device or a distance-varying device 50 for varying the maximum permissible spacing between the pressure plates 10 and 12.

This friction device 50 has in the example of the embodiment according to the invention shown in FIG. 2 a bolt which is designed more particularly as a stepped bolt 52 and which extends substantially in or through the pressure plates 10, 12 and the intermediate plate 24.

The stepped bolt 52 is thereby preferably mounted substantially freely movable, more particularly freely movable in the axial direction, in the pressure plate 10 and intermediate plate 24. The stepped bolt is preferably housed in the pressure plate 12 by a friction or clamping device 50 which produces at least at times a substantially fixed connection between the stepped bolt 52 and the pressure plate 12.

The substantially fixed connection between the stepped bolt 52 and the pressure plate 12 is thereby preferably designed so that a clamping screw 54 or the like is screwed into the pressure plate 12 and exerts a normal force on the more particularly sleeve-shaped surface of the stepped bolt 52 so that an axial movement between the stepped bolt and the pressure plate 12 is prevented at least then when the force acting in the axial direction between the pressure plate 12 and the stepped bolt 52 is less than a predetermined force, more particularly one dependent on the clamping force.

It is preferable for example if this clamping force is preset or adapted to the pretensioning force of a spring device, more particularly the plate spring device 22, so that in the event of movement of the stepped bolt 52, and more particularly an axial movement of the bolt device 52 caused by the spring force of the plate spring device 22, the pressure plate 12 is also moved along, insofar as substantially only inertia forces, more particularly inertia forces of the stepped bolt 52 and of the pressure plate 12 counteract the spring force of the plate spring device 22, so that no relative movement takes place between the bolt 52 and the pressure plate 12.

If however the bolt is in a substantially axially fixed position—at least in relation to one orientation—which can be brought about for example by stopping against a stop, more particularly by a bolt head 56 stopping against the pressure plate 10, then the clamping or holding force is not sufficient to prevent a relative movement between the stepped bolt 52 and pressure plate 12, if the pressure plate 12 or an object substantially fixedly coupled thereto is not fixed in a similar way to the bolt 52, so that the relative movement is substantially not or not only achieved by a positive, force or friction locking between the stepped bolt 52 and pressure plate 12.

More particularly if the pressure plate 12 is movable substantially freely, with an axial fixing of the bolt device 52 the intermediate plate 24 is pressed through the plate spring device 22 in a direction away from the bolt head so that this biases the pressure plate 12 through the tapered rings 34, 36. The relative force between this pressure plate 12 and the (held) stepped bolt 52 is thereby greater than the set friction force acting in the axial direction. In this way a relative displacement is possible between the stepped bolt 52 and the pressure plate 12 which will be explained in further detail with reference to the following drawings.

It should be pointed out that instead of the clamping screw 54 it is also possible to use corresponding devices such as for example spring-loaded friction devices or the like.

Figure 3:
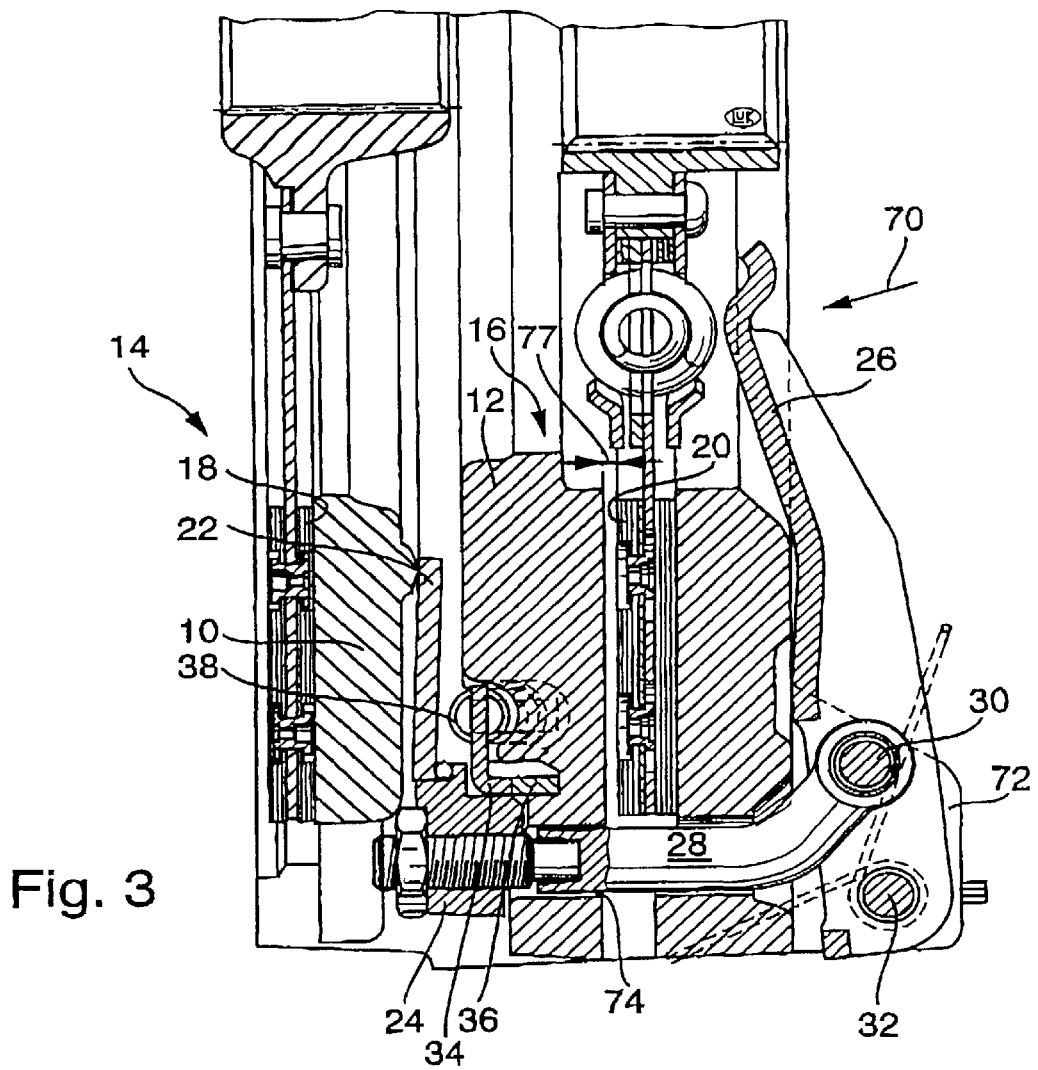
FIG. 3 shows the example of an embodiment according to FIG. 1 in a second clutch position.

FIG. 3 shows the example of the embodiment according to the invention shown in FIG. 1 in a released clutch position for the clutch assembly or driving clutch device 16.

Shifting into a released position of the clutch device 16 can be carried out in particular by moving the operating lever 26 in the direction of the arrow 70 or by turning the operating lever 26 about the axis or articulation point 32. One axis of the articulation point 32 is thereby mounted for example in the housing 72.

The intermediate lever 28 is preferably attached to the operating lever 26 at the bearing point 30. If—as in the example shown here—the bearing point 30 and the point at which the external force is introduced into the lever 26 are mounted on the same side of the bearing point 32 then the type of force (compression force or tensile force) introduced from outside into the operating lever 26 corresponds substantially to the type of force introduced from the operating lever 26 into the bearing point 30. This means in particular that in the example shown in FIG. 3, where the bearing point 30 and the point of force introduction are mounted substantially on the same side of the bearing point 32, when force is applied to the left or in the direction of the arrow 70 the bearing point 30 or the intermediate lever 28 is pressed to the left. According to the invention it is however also preferred if the bearing point 32 is arranged between the point of force introduction into the operating lever 26 and the bearing point 30. In such a case for example in order to produce a movement of the intermediate lever 28 to the left, a force directed to the right, thus a force directed opposite the arrow 70 would be introduced into the operating lever 26—for example at the upper end.

As a result of the operation of the operating lever 26 the intermediate lever 28 is forced to the left. The intermediate lever 28 runs with—an at least slight—play 74 through the pressure plate 12 and is connected rotationally secured—preferably at its end—to the intermediate plate 24. By way of example the intermediate lever 28 is screwed to the intermediate plate 24. Consequently a movement of the intermediate plate 24 in substantially the same direction or to the left corresponds with a lever movement of the lever 26 in this embodiment of the invention.

It should be noted that according to an embodiment of the invention (not shown) a spring assembly can be provided for example inside the assembly made up of the lever 26, intermediate lever 28 and intermediate plate 24. By way of example a spring assembly of this kind is arranged—for example switched in series—in the transitional area between the intermediate plate 24 and the intermediate lever 28. Then a movement of the intermediate plate 24 would not automatically correspond with a movement of the lever 26 for example.

An assembly having the tapered rings 34 and 36 is preferably mounted between the intermediate plate 24 and the pressure plate 12. The tapered rings 34, 36 are biased by the spring device 38 in the direction of an increasing distance between the intermediate plate 24 and the pressure plate 12. An uncontrolled adjustment through an unrestricted displacement of the tapered rings 34, 36 in the direction of an increasing distance between the intermediate plate 24 and the pressure plate 12 is avoided according to the invention.

This is achieved for example in that the force exerted by the spring device 38 on the tapered rings 34 and 36 is varied—substantially controlled. It is hereby proposed for example that the force counteracting the spring force of the spring device 38 and which likewise acts for example on the tapered rings 34, 36 is less than the spring force of the spring device 38 when a displacement of the displacement device or assembly of tapered rings is required or desired.

In situations where a displacement of the tapered rings is desired or necessary, the counter force to the force of the spring device 38 is preferably set or is such that this is less than the spring force of the spring device 38 so that the tapered rings are displaced opposite one another through the action of a resulting force and thus increase the distance between the pressure plate 12 and intermediate plate 24 or so long until a force equilibrium prevails at the tapered rings 34, 36 or until the force directed against the spring device 38 is greater than the force of the spring device 38.

It is hereby particularly preferred that the tapered rings 34, 36 are self-holding. It is hereby particularly preferred that the arrangement of tapered rings 34, 36 is designed as a freewheel. It is also preferred that at least one of these tapered ramps has a detent locking mechanism. It is also preferred that the ramps have a type of cogged surface wherein the spline is designed so that movement of the ramps relative to each other in a first direction is substantially possible and movement of the ramps in a second orientation opposite the first is substantially prevented.

The plate spring device 22 furthermore biases the intermediate plate 24. This plate spring device 22, as shown in FIG. 3, is preferably mounted between the first pressure plate 10 and the intermediate plate 24. So long as the pressure plate is not moved through the operating lever (not shown in FIG. 3) for opening the clutch device 14, 16 into a substantially opened clutch position, the pressure plate 10 is pressed substantially against the lining 10 by the plate spring device 22.

In a corresponding way the pressure plate 12 is pressed against the lining 20 by the plate spring device 22 which acts on the intermediate plate 24, through the coupling between the intermediate device 24 and the pressure plate 12, which will be described in more detail, provided a force is not introduced into the intermediate plate 24 or pressure plate 12 through the operating lever 26 as a result of which the pressure plate 12 is lifted off from the lining 20, as shown in FIG. 3.

By way of example the spring force of the spring device 22 is thereby dependent on the spring path or on the elongation. A change in the spring path would consequently condition a change in the force in the spring device 22. A clutch device 14, 16 without any adjustment device according to the invention, as shown for example in the drawings, could have the effect for example that as the wear on the linings increases the pressure plates 10 and 12 are pressed under the action of the spring device 22 against the linings 18, 20 whose spacing has increased though the wear, so that the force in the spring device 22 changes. The force in the plate spring device 22 which is therefore changed could have the effect for example that also the operating force which is to be applied onto the operating lever 26 would change.

It should be pointed out that the linings 18, 10 are preferably resilient.

Figure 4:
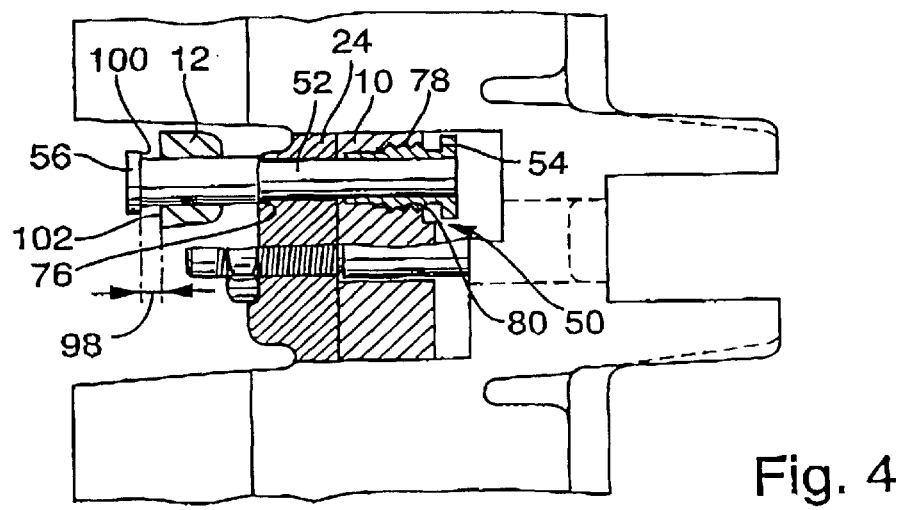
FIG. 4 shows the embodiment according to FIG. 3 in a second sectional plane.

FIG. 4 shows the example of the embodiment of FIG. 3 in a second plane showing in particular one example of the position of the stepped bolt device 52 in a released position.

As already explained, the intermediate plate 24 for disengaging is displaceable to the left through the operating lever 26 or the intermediate lever 28. More particularly when there is no wear appearing on the discs 18, 20 the stepped bolt 52 substantially follows the movement of the intermediate plate 24 since the intermediate plate 24 is coupled—particularly through the step or through the shoulder 76—with the stepped bolt 52—at least in the absence of wear on the discs 18, 20 as well as a movement of the intermediate plate to the left, or adjoins the stepped bolt 52.

The stepped bolt 52 is hereby moved to the left. The stepped bolt is thereby pressed in particular through the first pressure plate 10 or the bolt head 56 of the stepped bolt 52 increasingly away from the pressure plate 10, more particularly to the left.

The second pressure plate 12 is in turn fixedly connected to the stepped bolt 52 at least under predetermined conditions—more particularly at least at times and/or at least in part. More particularly the second pressure plate 12 is connected to the stepped bolt 52 through the clamping or friction device 50 under predetermined conditions. More particularly this friction device 50 has a friction or clamping screw 54.

This clamping screw 54 is thereby formed for example as a hollow element. More particularly the clamping screw 54 is formed as a type of sleeve which supports a thread 78 on its outer sleeve face. This thread 78 can be screwed into a thread 80 which is mounted inside the pressure plate 12. More particularly a radially directed clamping force is exerted on the stepped bolt 52 through this coupling or through screwing the threads 78, 80 together.

This clamping force is preferably predetermined. It is also particularly preferred if this clamping force is adjustable. According to the invention it is preferably proposed that this clamping force is substantially constant or can be set constant for a predetermined time, more particularly throughout the service life. It is also preferred if the clamping screw 54 is slit at least in part in the longitudinal direction. By an at least partial slit in the longitudinal direction of the clamping screw 54 is meant here in particular that the clamping screw 54 has a slit in its wall along the path of which at least the axial position is also changed. A non-continuous slit is also understood by this for example.

According to the invention other clamping devices or friction devices 50, such as for example a clamping or friction assembly 50 are preferred which have wedges or wedge rings or the like which run towards each other. By way of example a device or element is preferred which allows an at least also radially inwardly aligned force. By way of example an element is preferred, such as a friction lining or the like for example, which acts under spring force on the stepped bolt 52. The aforementioned wedge rings or wedges can have for example an area in which they are screwed against each other. By way of example the area of one wedge has a through bore whilst an area of the second wedge or wedge ring has an at least radially outwardly aligned oblong hole so that the wedges or wedge rings are able to 'wander' radially relative to each other when they are connected to a connecting element, such as for example a screw.

The distance between the intermediate plate 24 and the pressure plate 10 is determined in particular by the first tapered ring 34, the second tapered ring 36 as well as the spring device 38. More particularly this spacing is substantially not changed or is held constant by the first tapered ring 34, the second tapered ring 36 and the spring device 38 or is held constant through the interaction of the tapered rings 34, 36 as well as the spring device 38 if substantially no wear has appeared on the discs 18, 20 which would need compensating.

Particularly as the intermediate plate 24 strikes against the shoulder 76 the tapered rings 34 and 36 are not displaced relative to each other as a result of the spring force of the spring device 38 since a corresponding play area does not exist.

The bolt device 52 is pressed by the pressure plate 10 which is substantially fixed in its position. The pressure plate 10 adjoins the disc 18 for example. It is also preferable if the pressure plate 10 or the clutch disc 18 is likewise released when the clutch device 16 is released. As can be seen by comparing FIGS. 3 and 4 the distance 77 between the pressure plate 12 and the disc 20 corresponds substantially to the distance 98 between the end face 100 of the bolt head 56 facing the pressure plate 10, and the end face 102 facing the bolt head 56, of the pressure plate 10 which serves in particular as a stop for the bolt head 56.

Figure 5:
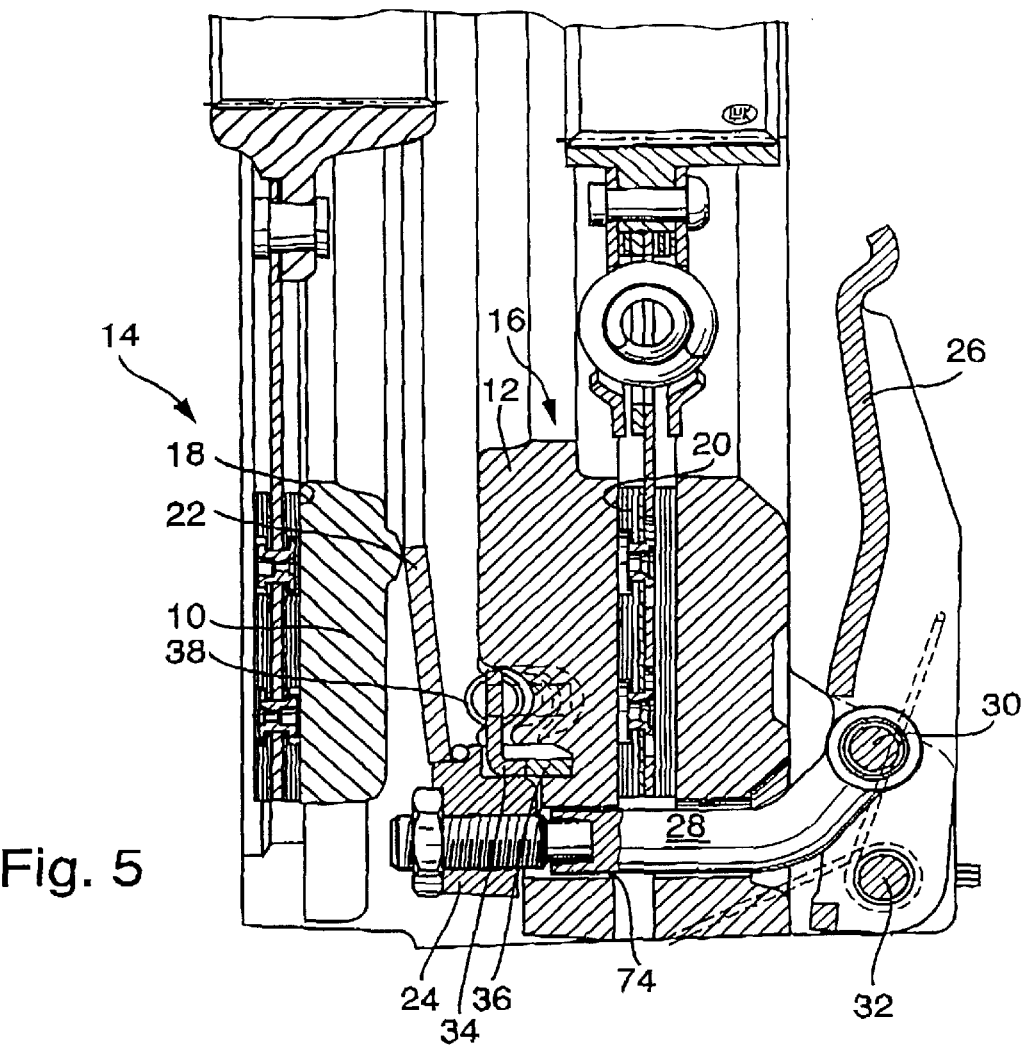
FIG. 5 shows the example of an embodiment according to FIG. 1 in a second state of the clutch discs.

FIG. 5 shows the device according to the invention in a second state. Here the driving disc or the disc 20 is at least partly worn.

As can be seen from FIG. 5, the operating lever is substantially unstressed so that the pressure plates 10, 12 also substantially adjoin the discs 18, 20.

This contact despite the presence of wear is due in particular to the fact that the plate spring device 22 presses the pressure plates 10, 12 apart from each other. For this purpose it presses with its one end directly against the pressure plate 10 whilst it presses at its other end against the intermediate plate 24 which through an arrangement which comprises in particular the spring device 38 as well as the tapered rings 34, 36, and/or the friction device 50, exerts pressure on the pressure plate 12 which is thus pressed against the disc 20. The plate spring device 22 has hereby relaxed increasingly so that in particular the spring force has changed or reduced.

Particularly as a result of this changed plate spring device or its changed position the danger arises that the release force which is required to disengage into a released position is also changed.

This is avoided through a device according to the invention, more particularly through an adjustment device according to the invention.

Figure 6:
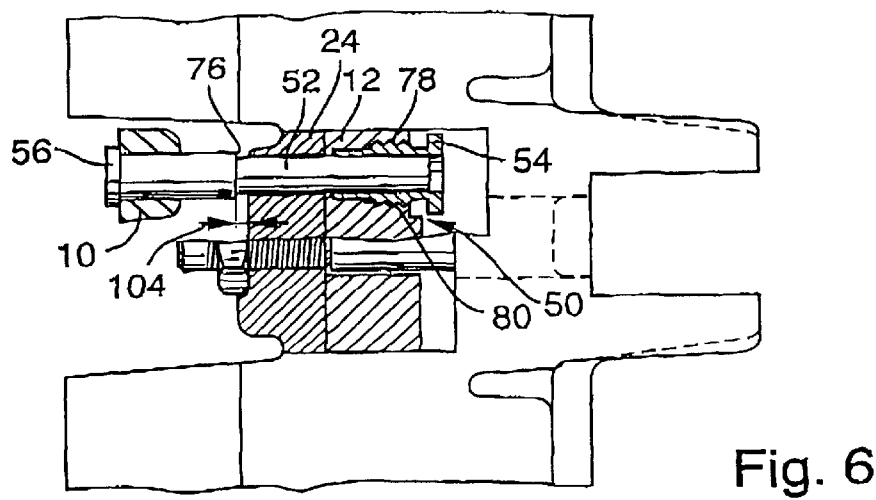
FIG. 6 shows the embodiment according to FIG. 5 in a second sectional plane.

FIG. 6 shows a device according to the invention in the state of FIG. 5 in a second plane.

It can be seen from FIG. 6 or by comparing FIGS. 2 and 6 that the intermediate plate 24 or the contact pressure plate 12 has moved by the distance 104 relative to the shoulder 76 of the stepped bolt 52. This distance 104 corresponds substantially to the wear which has appeared on the discs 18, 20, more particularly here on the driving disc or the disc 20.

This distance is due in particular to the fact that the disc 20 which represents for example a type of "stop" has moved to the right so that the pressure plate 12 can move further to the right. The spring device 22 however as already mentioned presses the pressure plates 10, 12 apart so that the position of the pressure plate 10 is substantially unchanged, namely adjoining the disc 18.

Since here the bolt head 56 of the stepped bolt stops against the pressure plate 10, the plate spring device 22 tensions the pressure plate 10 opposite the pressure plate 12 and the pressure plates 10, 12 each (ought to) adjoin the discs 18, 20, the clamping force of the clamping device 50 is here overcome at least at some times so that the pressure plate 12 can move, more particularly together with the intermediate plate 24, along the bolt to the right until the pressure plate 12 stops against the disc 20. More particularly the spring force of the plate spring 22 is (thereby) then also greater than the clamping force which the clamping device applies or which the clamping screw 54 exerts on the stepped bolt 52 when the plate spring 22 has relaxed in part as a result of the wear.

It is thereby preferable if the plate spring 22 is selected and pre-set so that with a predetermined amount of wear and more particularly with the maximum possible amount of wear on one and/or both discs 18, 20 the plate spring 22 is greater than the clamping force or friction force which is applied by the clamping or friction device 50. It is also preferred if under predetermined conditions with a predetermined amount of wear or with the maximum amount of wear the plate spring force of the—in particular partially relaxed—plate spring 22 is greater than the friction force by a predetermined amount. It is further preferred if the ratio of the plate spring force and the friction force or clamping force of the friction device 50 under the aforementioned circumstances is greater by a predetermined amount than one.

It should be pointed out that the displacement between the pressure plate 12 and the stepped bolt 52 occurs more particularly when the stepped bolt 52 is fixed in its position—at least in relation to one orientation—more particularly by the bolt head 56 stopping against the pressure plate 10. So long as this type of fixing does not exist the unit comprising the intermediate plate 24 and pressure plate 12 as well as the stepped bolt 52 is displaced as a whole since in particular the relative force between the stepped bolt 52 and the pressure plate 12 in the axial direction is substantially zero.

During the next release process the operating lever 26 illustrated in FIG. 5 is operated anew so that a force is exerted on the intermediate plate 24 through the intermediate lever 28 in the manner substantially explained already above. As a result of this force the intermediate plate 24 which is mounted movable on the stepped bolt 52 is displaced to the left and is thereby removed from the second pressure plate 12 at least so long until the intermediate plate 24 stops against the shoulder 76.

This removal makes it possible for the tapered rings 34, 36 to be displaced under the action of the spring device 38 until these tapered rings 34, 36 again fill out axially the area released by the displacement of the intermediate plate 24 on the shoulder 76 of the stepped bolt 52.

It is particularly preferred if the component of the force of the spring device 38 which acts in the direction of the holding force of the clamping device 50 is less than the holding force of the clamping device 50. It is hereby possible in particular that as a result of the spring device 38 as well as the tapered rings 34, 36 these rings are only displaced relative to each other until they fill out the aforementioned released area. Then it is basically preferred that no further displacement of the pressure plate 12 takes place in the axial direction.

Figure 7:
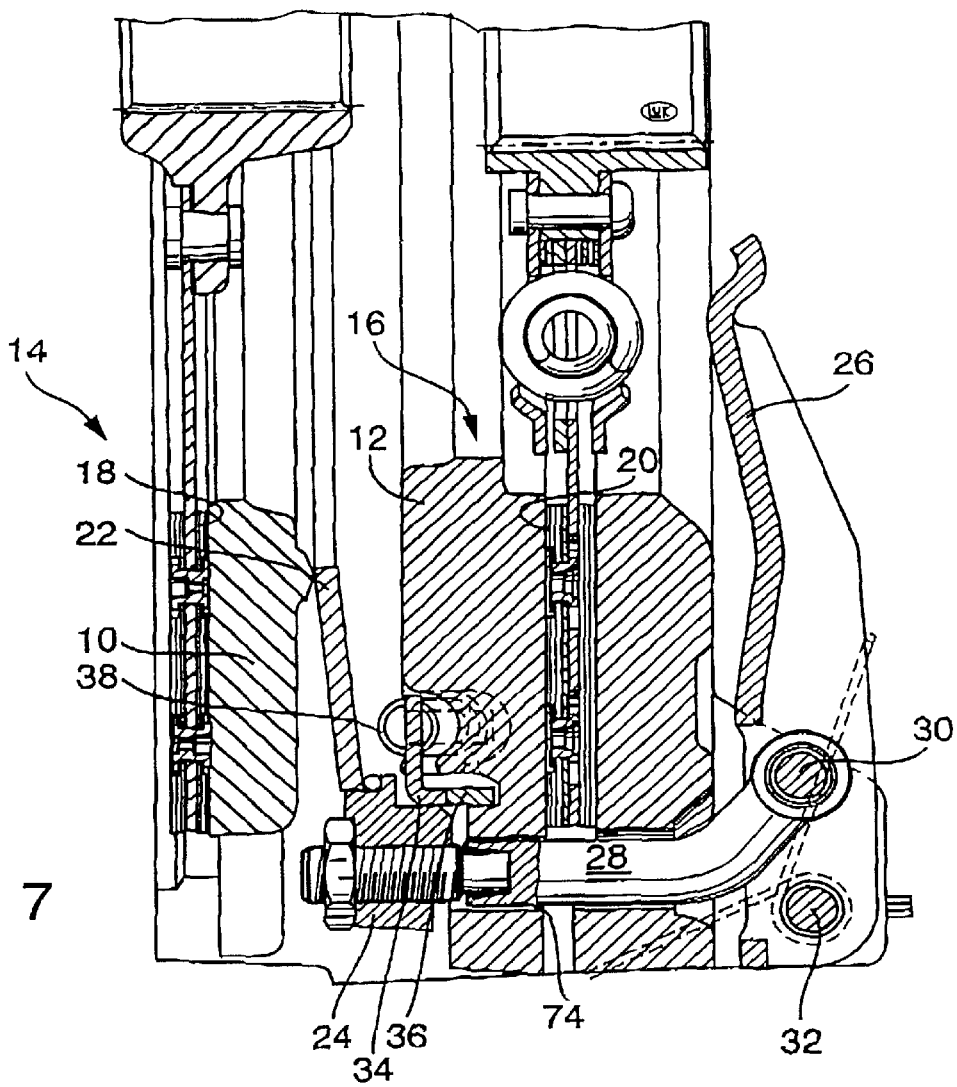
FIG. 7 shows the example of an embodiment according to FIG. 1 in a third state of the clutch discs.
Figure 8:
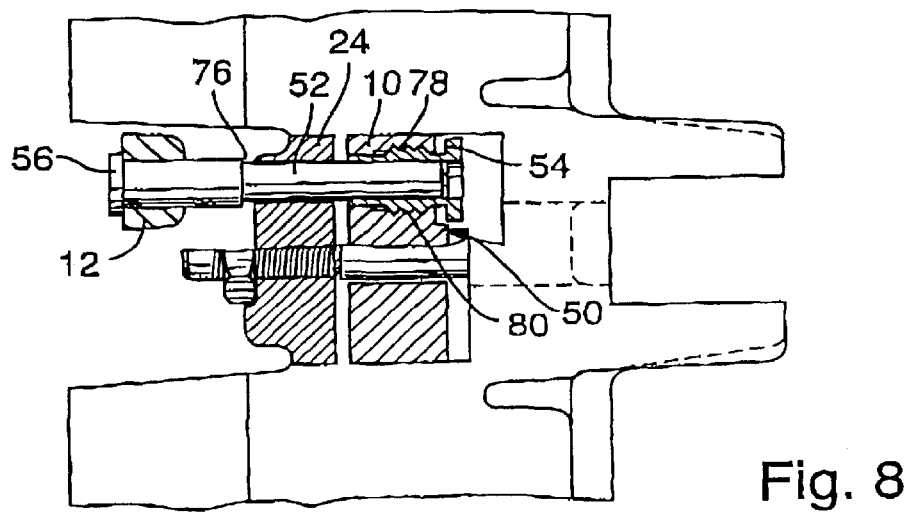
FIG. 8 shows the example of an embodiment according to FIG. 7 in a second sectional plane.

FIGS. 7 and 8 show illustrations corresponding to FIGS. 5 and 6 wherein wear has occurred on the two discs 18 and 20.

Figure 9:
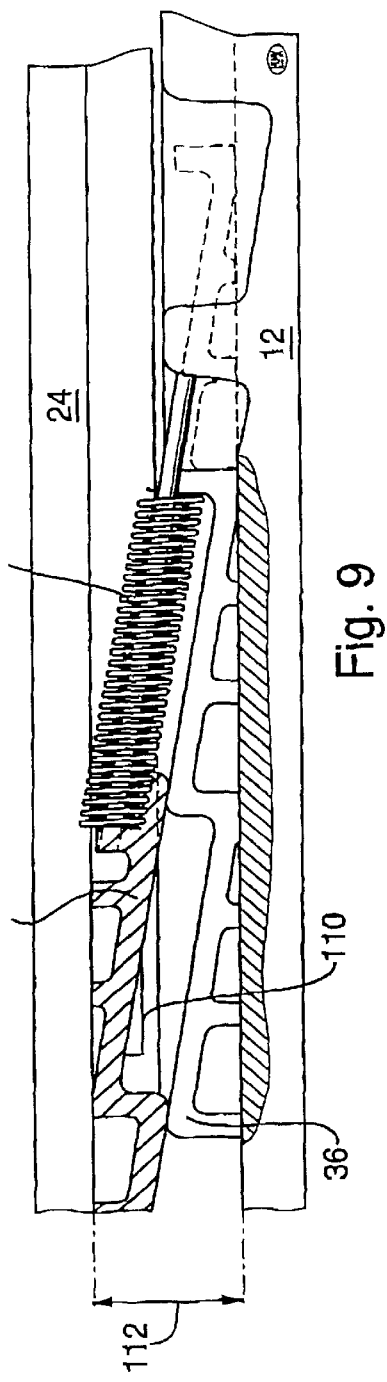
FIG. 9 shows the adjusting device for the clutch used in the example of an embodiment according to the invention in a partial sectional view in a first position.

FIG. 9 shows the adjustment device in a diagrammatic partial sectional view. An assembly comprising the spring device 38, a first tapered ring 34 as well as a second tapered ring 36 is provided between the intermediate ring 24 and the pressure plate 12 or the tapered rings 34, 36 are enclosed by the relevant plates 24, 12. The tapered ramps each have a pitch which is shown diagrammatically by the pitch triangle 110. The spring device 38 loads the tapered ring 34 so that it is pressed in the direction of the rising pitch of the ring 36 so that in the event that there is not sufficient counter force opposing this spring force of the spring device 38, the spacing 112 would increase. As shown for example by the enlarged cut-out section 116 for the area 114—in order to prevent a reduction in the spacing 112, holding devices or detent locking devices are provided more particularly acting on one side and arranged in particular along the ramps.

Figure 10:
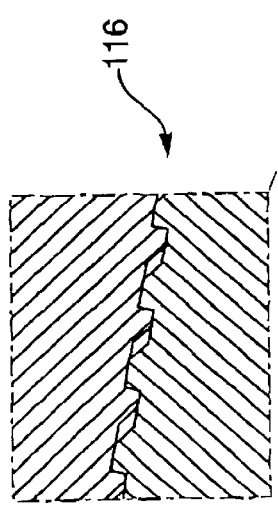
FIG. 10 shows the illustration according to FIG. 9 in a second position.
Figure 10:
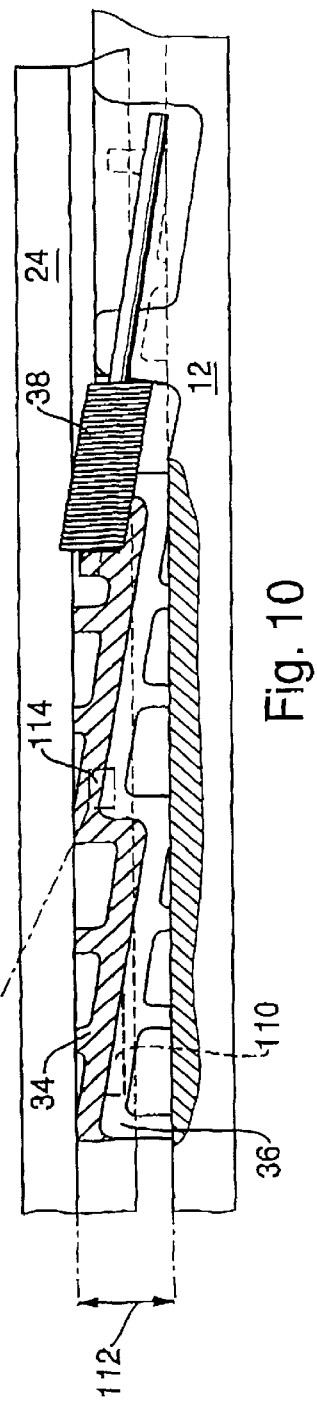

FIG. 10 shows the object illustrated in FIG. 9 in a second state in which wear has appeared on the discs 18 and/or 20.

Particularly as a result of the enlarged spacing of the intermediate ring 24 from the pressure plate 12 or through the enlargement of this spacing the spring device 38 presses the tapered ring 34 "high" on the incline 110 so that the spacing 112 is enlarged and the device comprising the tapered rings 34, 36 as well as the spring device 38 fills out the interspace between the intermediate plate 24 and the pressure plate 12. It is also preferred if one or both of the tapered rings 34, 36 is coupled to the relevant adjoining plate 24 or 12 so that the spring device 38 displaces a one-piece element 34, 24 opposite a one-piece element 36, 12 whilst increasing the spacing 112. It is also preferable if a one-piece coupling of this kind exists only between one of the rings 34, 36 and the relevant adjoining plate 24, 12.

It should be pointed out that preferably a device (not shown) prevents the rings from escaping in order to avoid an enlargement of the spacing 112.

Figure 11:
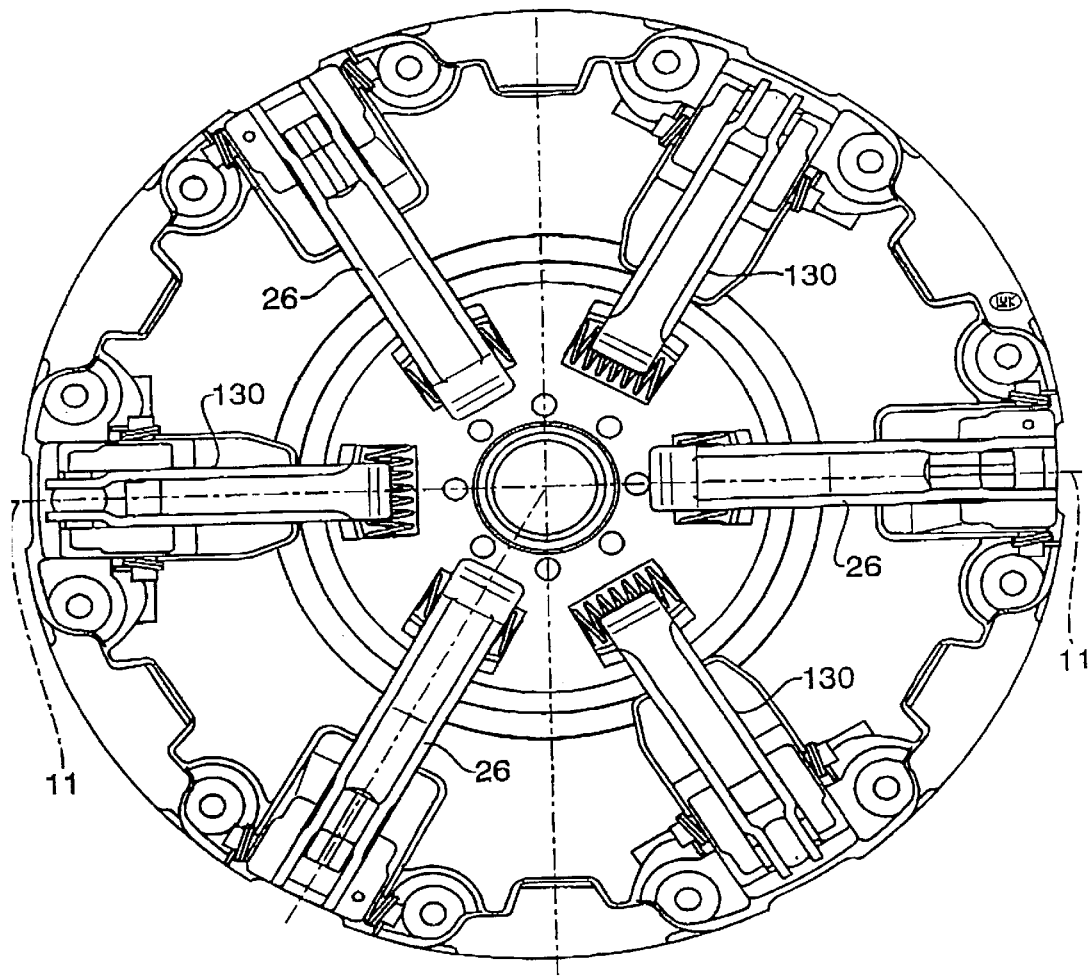
FIG. 11 shows a side view of an example of a clutch device according to the invention in which the operating levers are visible.

FIG. 11 shows as an example a plan view of a device as shown by way of example and in partial section in FIGS. 1 to 8.

The illustration according to FIG. 11 shows one example of the arrangement of the operating levers 26, 130 wherein the operating levers 26 are provided for coupling or engaging and releasing the clutch device 16 whilst the operating levers 130 are provided for coupling the clutch device 14.

Figure 12:
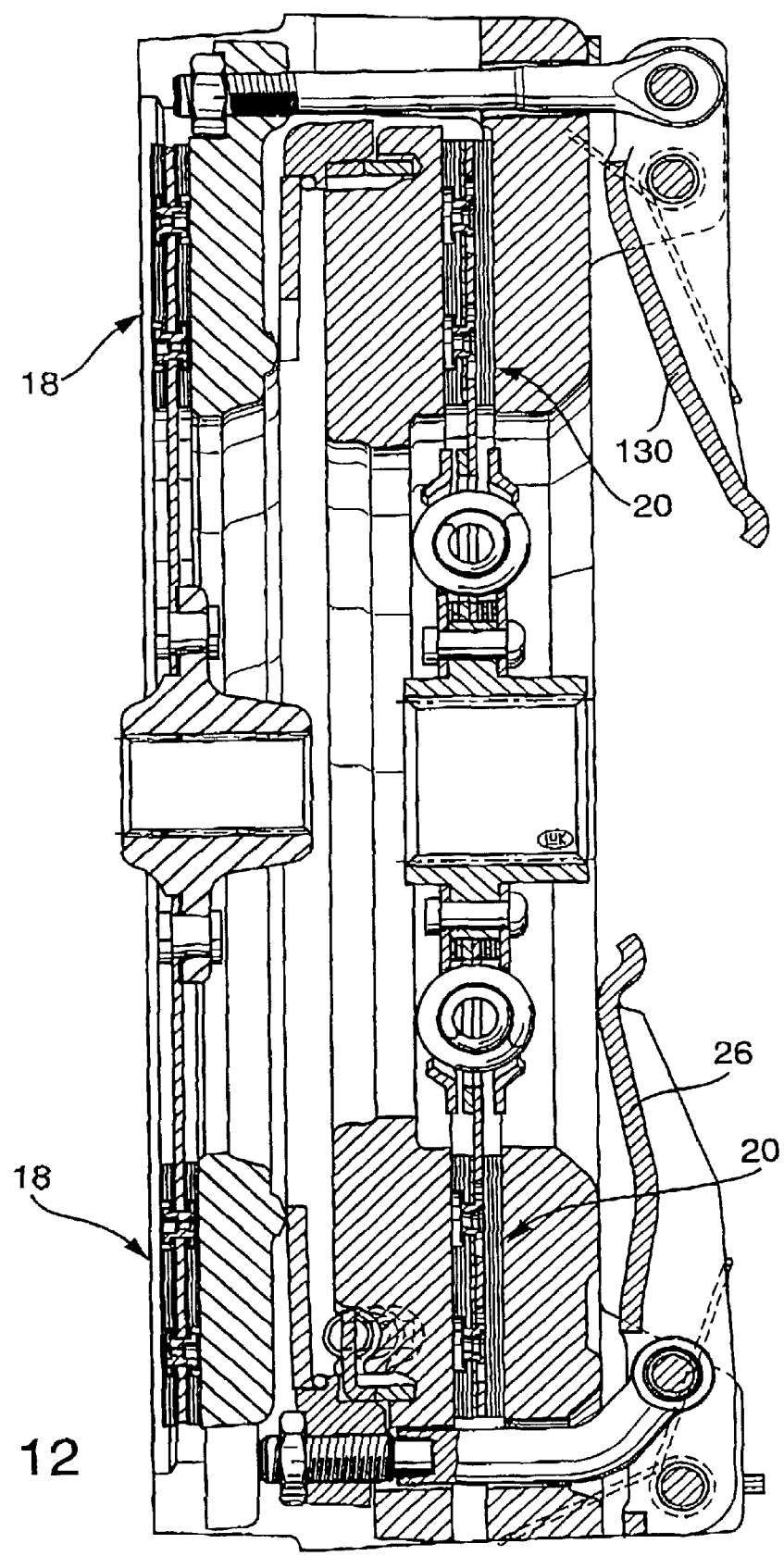
FIG. 12 shows a sectional view of FIG. 11 along the line 11—11

FIG. 12 shows a sectional view along the line 11—11 in FIG. 11. This arrangement shows by way of example the arrangement of the operating lever 26 for operating the clutch device 16 compared with the arrangement of the operating lever 130 for coupling the clutch device 14.

Figure 13:
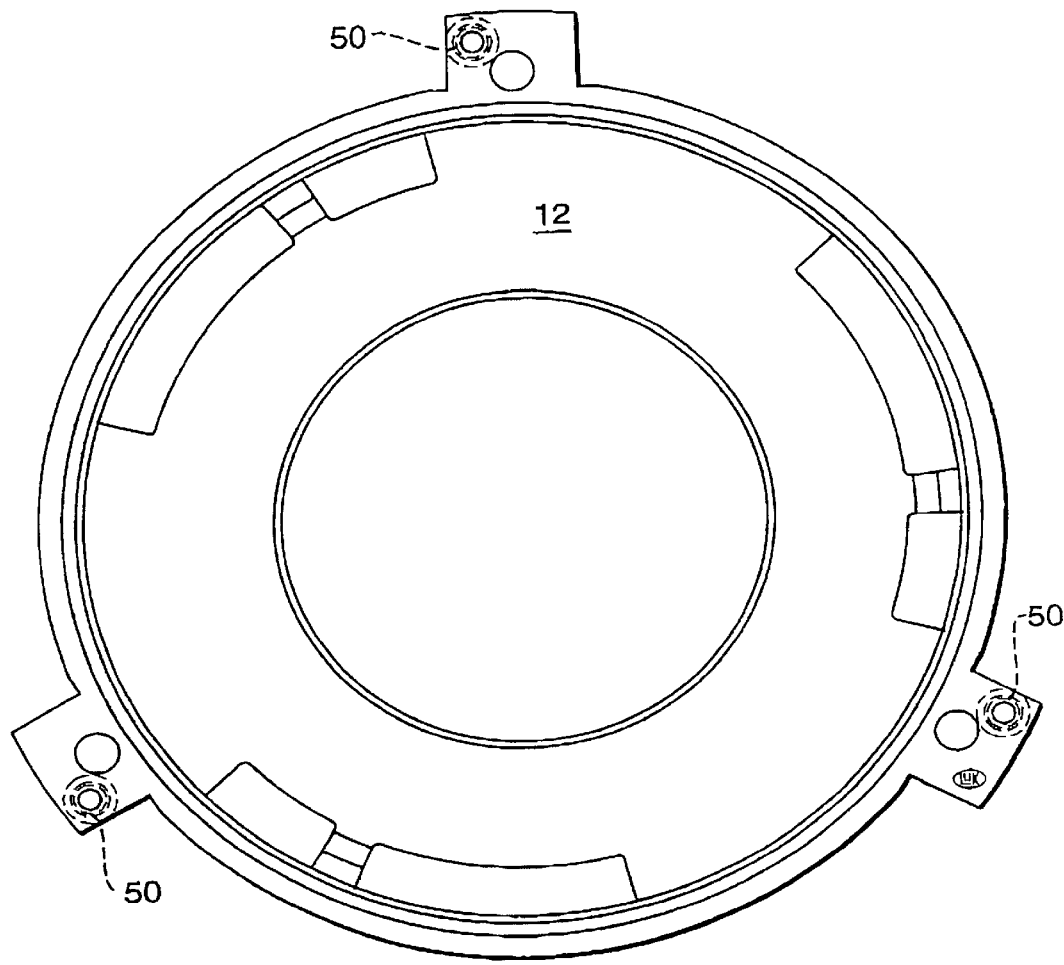
FIG. 13 shows a plan view of a pressure plate according to the invention on the transmission side with a friction device.

FIG. 13 shows an example of the pressure plate 12 according to the invention on the transmission side. In particular the arrangement of the at least one friction device 50 is shown.

Figure 14:
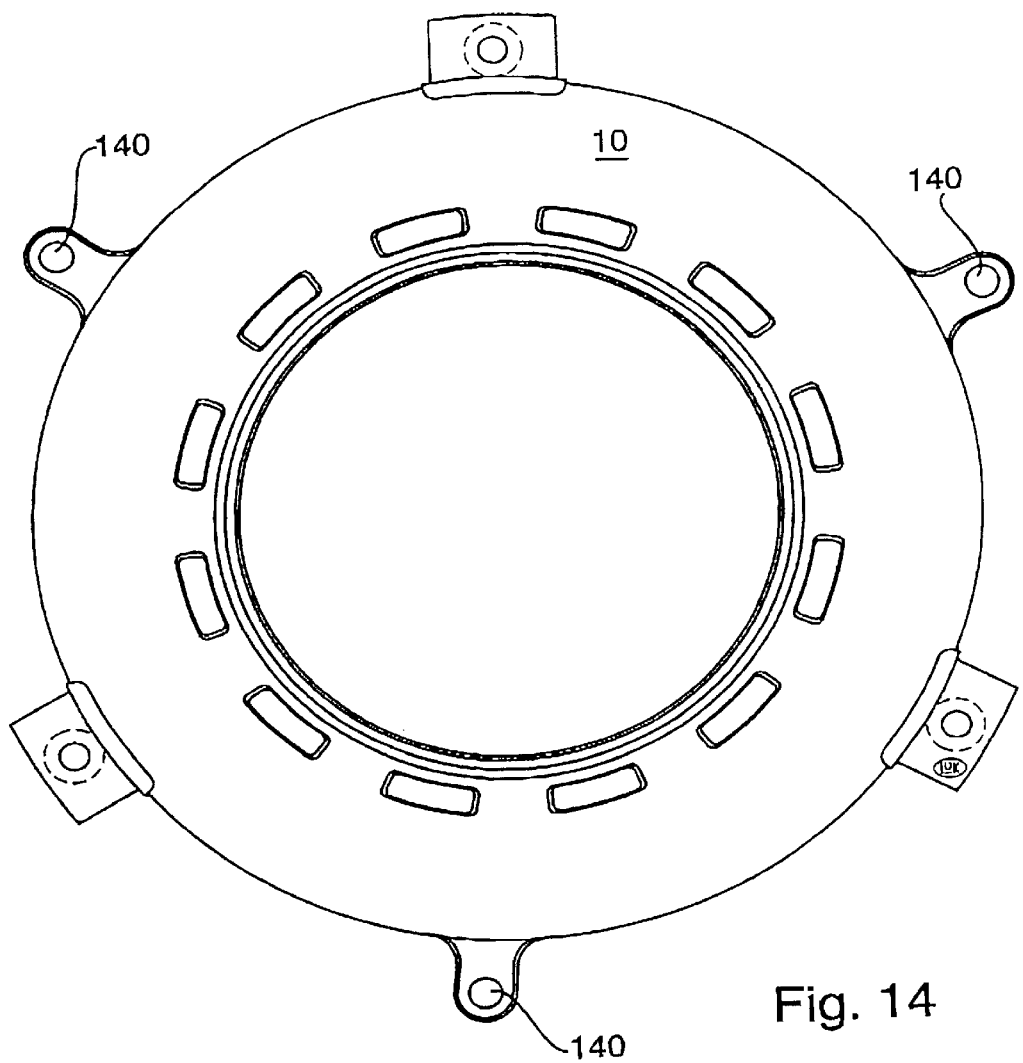
FIG. 14 shows a plan view of a pressure plate on the engine side with a through bore for a stepped bolt, such as is embraced for example by a clutch device according to the invention

FIG. 14 shows an example of the design of the pressure plate 10 on the engine side having through bores 140 for holding the stepped bolts 152.

According to the invention it is thus proposed that the at least one clutch device of a motor vehicle such as for example a tractor or commercial vehicle adjusts automatically and/or independently so that in particular the operating force of the clutch device is moved within a tolerance band substantially throughout the service life, with the width of this tolerance band preferably being moved towards zero.

What is claimed is:

1. A clutch assembly comprising:
    at least two clutches, each clutch having a pressure plate axially movable by an actuator means to engage and disengage said clutch as the pressure plate cooperates with at least one clutch disc through friction linings;
    at least one energy-storing device biasing the at least two pressure plates;
    a wear-compensating adjustment device arranged between at least one of the pressure plates and the energy-storing device to compensate for the wear on at least one of the friction linings;
wherein the clutch assembly is adapted, so that each of the at least two clutches can be separately engaged to and disengaged from different rotary transmission shafts.

2. The clutch assembly of claim 1, wherein the at least two pressure plates are biased by the energy accumulator device in the direction of a closed clutch position.

3. The clutch assembly of claim 1, wherein a required actuation-force profile of at least one of said clutches is regulatable by the at least one adjustment device in dependence on an amount of friction-lining wear on the at least one clutch disc.

4. The clutch assembly of claim 1, wherein the at least one energy-storing device comprises a plate spring device and the at least one adjustment device regulates a spring force on the plate spring device so that said spring force remains adjusted substantially to a predetermined value when the clutch assembly is in a non-actuated state.

5. The clutch assembly of claim 1, wherein the at least one adjusting device is controlled by at least one of force and displacement.

6. The clutch assembly of claim 1, wherein at least two of said at least two clutches are self-adjustable.

7. The clutch assembly of claim 1, wherein the self-adjustable clutches are self-adjustable by an identical self-adjustment device.

8. The clutch assembly of claim 1, wherein the adjustment device performs an adjustment under predetermined conditions in a release phase of at least one of the at least two clutches.

9. The clutch assembly of claim 1, further comprising at least one device for preventing uncontrolled adjustment of the adjustment device.

10. The clutch assembly of claim 1, wherein the pressure exerted by the at least one energy-storing device on the at least two pressure plates remains substantially constant, at least when the at least two clutches are engaged.

11. The clutch assembly of claim 1, wherein at least one of the at least two clutches is a driving clutch.

12. The clutch assembly of claim 1, wherein at least one of the clutches is a non-driving clutch.

13. The clutch assembly of claim 1, wherein the at least two clutches are operable through an operating device common thereto.

14. The clutch assembly of claim 1, wherein the at least two clutches are operable through at least partially different operating devices.

15. The clutch assembly of claim 1, wherein adjustment is substantially independent of the actual site on the clutches where wear has occurred.

16. The clutch assembly of claim 1, wherein the at least one adjustment device has at least a first device and at least a second device, and wherein in the event of wear on the at least one clutch disc, a range of adjustment can be released by the first device, and whereby this range of adjustment can be removed at least partially by the second device, for at least partially removing the wear.

17. The clutch assembly of claim 16, wherein at least the first device generates a play in the event of wear on the friction linings of at least one clutch disc.

18. The clutch assembly of claim 17 wherein the play is generated so that it is effective between at least one of the pressure plates and a stop that is position-adjustable relative to said at least one of the pressure plates.

19. The clutch assembly of claim 17 wherein the play is eliminated when at least one of the clutches is disengaged.

20. The clutch assembly of claim 16, wherein the first device comprises at least one sensor device for detecting a relative movement of the at least two pressure plates with respect to a predetermined relative position thereof in a non-actuated state of the clutch assembly.

21. The clutch assembly of claim 20, wherein the at least one sensor device is coupled to at least one component part which, during an operation of the clutch, is moved at least at times in dependence on the clutch operation.

22. The clutch assembly of claim 20, wherein at least one of the adjustment device and the at least one sensor device has at least one clamping device that operates by one of friction and clamping.

23. The clutch assembly of claim 22, wherein a predetermined amount of force can be applied by the at least one clamping device.

24. The clutch assembly of claim 22, wherein the at least one clamping device has at least one spring device.

25. The clutch assembly of claim 24, wherein a force can be applied by the at least one spring device.

26. The clutch assembly of claim 22 wherein the at least one clamping device has at least one clamping screw which when screwed in axially produces a radially aligned force.

27. The clutch assembly of claim 26 wherein the at least one clamping screw has a radially inner hollow area.

28. The clutch assembly of claim 22, wherein an adjustable clamping force can be applied by the at least one clamping device.

29. The clutch assembly of claim 22, wherein a clamping force can be applied substantially constantly throughout the service life by the at least one clamping device.

30. The clutch assembly of claim 22, wherein the at least one clamping device has a component part which has a longitudinal axis and is substantially slit in the direction of thereof.

31. The clutch assembly of claim 22, wherein the at least one clamping device mechanically holds components clamped thereby substantially immovable relative to each other when a force external thereto is applied that is less than a predetermined value.

32. The clutch assembly of claim 22, further comprising a bolt device that is enclosed at least in part by the clamping device.

33. The clutch assembly of claim 32, wherein the bolt device comprises a stepped bolt that has at least two areas which have at least one surface with at least one component running perpendicular to the stepped bolt's longitudinal axis and which serve substantially as a stop.

34. The clutch assembly of claim 33, wherein at least one of the at least two areas serves as a stop for the relative movement in a first direction and at least one of the at least two areas serves as a stop for the relative movement in a second direction.

35. The clutch assembly of claim 32, wherein the bolt device is mounted substantially movably inside at least two elements, wherein the at least two elements are part of a group of elements which comprises a first of the at least two pressure plates, a second of the at least two pressure plates, and an intermediate plate.

36. The clutch assembly of claim 35, wherein the bolt device is mounted movably in the first of the at least two pressure plates and the intermediate plate.

37. The clutch assembly of claim 32, wherein the bolt device comprises a stepped bolt that has a first shoulder which can function as a stop for a first of the at least two pressure plates, and a second shoulder which can function as a stop for an intermediate plate.

38. The clutch assembly of claim 32, wherein the bolt device is secured substantially against completely slipping out from a group of elements which comprises a first contact pressure plate, a second contact pressure plate and an intermediate plate.

39. The clutch assembly of claim 22, wherein the bolt device is mounted substantially movably inside a first of the at least two pressure plates and an intermediate plate and is held stationary in relation to a second of the at least two pressure plates by the clamping device when a force applied from outside and acting between the bolt device and the second of the at least two pressure plates is smaller than a predetermined force.

40. The clutch assembly of claim 16, wherein the first device can determine the relative movement of the at least two pressure plates caused by wear.

41. The clutch assembly of claim 16, wherein the first device has at least one movable part.

42. The clutch assembly claim 16, wherein at least one of the adjustment device and the second device is coupled at least functionally to an operating element so that adjustment by the at least one adjustment device is carried out when the operating element is moved.

43. The clutch assembly of claim 1, wherein when wear appears at least on the friction linings of the at least one clutch disc, at least a first element is moved relative to at least a second element in order to release an amount of play.

44. The clutch assembly of claim 1, wherein the relative position of the at least two pressure plates in relation to the clutch assembly can be changed dependent on at least the wear which has appeared on the friction linings of the at least one clutch disc.

45. The clutch assembly of claim 1, comprising at least one ring-shaped component for at least partially supporting at least one energy accumulator device that is tensioned against at least one of the at least two pressure plates.

46. The clutch assembly of claim 45, wherein the at least one ring-shaped component is mounted substantially between the at least two pressure plates.

47. The clutch assembly of claim 45, wherein the at least one ring-shaped component is mounted axially movably, wherein a movement thereof in a first direction is prevented under predetermined conditions.

48. The clutch assembly of claim 45, wherein the adjustment device has at least one freewheel type device for adjustment under predetermined conditions.

49. The clutch assembly of claim 48, wherein the freewheel type device is mounted between the ring-shaped component and one of the at least two pressure plates.

50. The clutch assembly of claim 1, wherein the energy-storing device comprises a plate spring and the adjustment device has at least two elements which are mounted movably relative to one another and serve to increase spacing between the plate spring and one of the at least two pressure plates.

51. The clutch assembly of claim 1, wherein the adjustment device has at least two elements which are mounted movably relative to one another and serve to increase spacing between the at least two pressure plates.

52. The clutch assembly of claim 1, wherein the adjustment device has at least two elements which are mounted movably relative to one another and which change their relative position to compensate for wear on at least the friction linings of the at least one clutch disk.

53. The clutch assembly of claim 52, wherein at least one of the at least two elements is biased by an energy accumulator whereby as a result of this biasing by the energy accumulator the distance between the at least two elements can be changed.

54. The clutch assembly of claim 1, wherein the adjustment device has at least two elements comprising ramps, and wherein the at least two elements increase their axial spacing during rotation in a first direction.

55. The clutch assembly of claim 54, wherein a device for maintaining spacing is mounted on at least one of the at least two elements that comprise the ramps.

56. The clutch assembly of claim 54, wherein the ramps are shaped to rise linearly.

57. The clutch assembly of claim 1, wherein the adjustment device has at least one energy accumulator device which biases at least one element of the adjustment device for changing spacing between components of the adjustment device.

58. The clutch assembly of claim 1, wherein the energy-storing device comprises at least one plate spring.

59. The clutch assembly of claim 1, wherein one common energy storing-device acts on the at least two pressure plates.

60. The clutch assembly of claim 1, wherein the at least one adjustment device ensures that the at least one energy-storing device is an at least approximately constant spring bias when the clutch assembly is in a non-actuated state.

61. The clutch assembly of claim 1 further comprising, arranged between the at least two pressure plates: at least part of a plate spring;

at least one ring-shaped intermediate plate;

at least a first ring-shaped element with at least one first ramp; and at least a second ring-shaped element with at least one second ramp; and at least one spring device for biasing at least one of the first and second ring-shaped elements.

62. A clutch assembly comprising:

at least two pressure plates that are axially movable independently of each other by actuator means, each of said pressure plates cooperating with at least one clutch disc through friction linings when the clutch assembly is being used;

a wear-compensating adjustment device arranged between the actuator means of at least one of the pressure plates and said at least one pressure plate itself to compensate for the wear on at least one of the friction linings of the clutch disc cooperating with said pressure plate;

whereby a position of the actuator means of said at least one pressure plate is kept at least substantially constant in an engaged condition of said pressure plate.

63. The clutch assembly of claim 62, further comprising an energy-storing device acting on at least one of the at least two pressure plates.

64. A clutch assembly comprising:

at least two pressure plates that are axially movable independently of each other by actuator means, each of said pressure plates cooperating with at least one clutch disc through friction linings when the clutch assembly is being used;

at least one energy-storing device acting on at least one of the pressure plates; and a wear-compensating adjustment device arranged between the at least one energy-storing device and the at least one pressure plate to compensate for the wear on at least one of the friction linings of the clutch disc cooperating with said pressure plate; said wear-compensating means effecting an axial displacement of the pressure plate relative to the energy-storing device dependent on the wear on said at least one of the friction linings.

* * * * *